(12) United States Patent
Kaneko et al.

(10) Patent No.: US 11,932,226 B2
(45) Date of Patent: Mar. 19, 2024

(54) CONTROL SYSTEM AND CONTROL METHOD

(71) Applicant: Robert Bosch GmbH, Stuttgart (DE)

(72) Inventors: Shoichiro Kaneko, Kanagawa (JP); Yoshiki Takahashi, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 17/604,068

(22) PCT Filed: Apr. 14, 2020

(86) PCT No.: PCT/IB2020/053486
§ 371 (c)(1),
(2) Date: Oct. 15, 2021

(87) PCT Pub. No.: WO2020/217132
PCT Pub. Date: Oct. 29, 2020

(65) Prior Publication Data
US 2022/0153246 A1    May 19, 2022

(30) Foreign Application Priority Data

Apr. 15, 2019 (JP) .................................. 2019-077211

(51) Int. Cl.
*B60T 8/00* (2006.01)
*B60T 8/17* (2006.01)
(Continued)

(52) U.S. Cl.
CPC ............ *B60T 8/261* (2013.01); *B60T 8/1706* (2013.01); *B60T 8/3225* (2013.01); *B60T 2240/06* (2013.01)

(58) Field of Classification Search
CPC ...... B60T 8/261; B60T 8/1706; B60T 8/3225; B60T 2240/06
See application file for complete search history.

(56) References Cited

U.S. PATENT DOCUMENTS 10,752,241 B2 * 8/2020 Kuttenberger ............ B60T 7/12
2003/0141158 A1 * 7/2003 Beringer ............... B60T 8/1831
188/349

(Continued)

FOREIGN PATENT DOCUMENTS

WO    2010113308 A1    10/2013

OTHER PUBLICATIONS

International Search Report and Written Opinion for Application No. PCT/IB2020/053486 dated Aug. 10, 2020 (9 pages).

*Primary Examiner* — Truc M Do
(74) *Attorney, Agent, or Firm* — Michael Best & Friedrich LLP (57) ABSTRACT

The present invention obtains a control system and a control method capable of appropriately suppressing rear lift-up of a straddle-type vehicle.
In the control system and the control method according to the present invention, damping forces of suspensions and a braking force generated to the straddle-type vehicle are controlled. Braking force adjustment control is executed to adjust the braking force generated to the straddle-type vehicle so as to suppress the rear lift-up that causes a rear wheel of the straddle-type vehicle to lift off from the ground, and initiation timing of the braking force adjustment control is controlled by using a physical quantity to which states of the suspensions are reflected.

13 Claims, 5 Drawing Sheets

(51) Int. Cl.
*B60T 8/26* (2006.01)
*B60T 8/32* (2006.01)

(56) References Cited

U.S. PATENT DOCUMENTS

| | | | |
|---|---|---|---|
| 2013/0030649 A1* | 1/2013 | Matsuda | B60T 8/3225 |
| | | | 701/38 |
| 2018/0072286 A1 | 3/2018 | Hirokami et al. | |
| 2018/0265057 A1* | 9/2018 | Hasegawa | B60T 8/172 |
| 2019/0359192 A1* | 11/2019 | Ohtaka | B60T 8/328 |

* cited by examiner

CONTROL SYSTEM AND CONTROL METHOD

BACKGROUND OF THE INVENTION

The present disclosure relates to a control system and a control method capable of appropriately suppressing rear lift-up of a straddle-type vehicle.

A posture of a straddle-type vehicle such as a motorcycle tends to become unstable when compared to postures of other vehicles. Thus, when an excessive braking force is generated to the straddle-type vehicle, a phenomenon called rear lift-up that causes a rear wheel to lift off from the ground possibly occurs. From a perspective of improving travel stability of the straddle-type vehicle, it is important to suppress the rear lift-up. For example, as a technique of suppressing the rear lift-up, as disclosed in WO 2010/113308, there is a technique of determining whether the rear lift-up currently occurs, and adjusting the braking force generated to the straddle-type vehicle so as to suppress the rear lift-up when it is determined that the rear lift-up currently occurs.

By the way, in the related art such as the technique disclosed in WO 2010/113308, the determination on whether the rear lift-up currently occurs is frequently made by using a detection result of a wheel rotational frequency sensor. That is, initiation timing of braking force control for suppressing the rear lift-up is frequently controlled by using the detection result of the wheel rotational frequency sensor. Here, the determination on the rear lift-up by using the detection result of the wheel rotational frequency sensor is made on the basis of a difference between a rotational frequency of a front wheel and a rotational frequency of a rear wheel, for example. However, there is a case where there is no difference between the rotational frequency of the front wheel and the rotational frequency of the rear wheel even when the rear lift-up occurs, for example. In this case, it is difficult to appropriately determine whether the rear lift-up currently occurs. For this reason, in the related art, it is difficult to appropriately suppress the rear lift-up.

SUMMARY OF THE INVENTION

The present invention has been made with the above-described problem as the background and therefore obtains a control system and a control method capable of appropriately suppressing rear lift-up of a straddle-type vehicle.

Solution to Problem

A control system according to the present invention is a control system for controlling behavior of a straddle-type vehicle that includes suspensions, and includes a control section that controls damping forces of the suspensions and a braking force generated to the straddle-type vehicle. The control section executes braking force adjustment control for adjusting the braking force generated to the straddle-type vehicle so as to suppress rear lift-up that causes a rear wheel of the straddle-type vehicle to lift off from the ground, and controls initiation timing of the braking force adjustment control by using a physical quantity to which states of the suspensions are reflected.

A control method according to the present invention is a control method for controlling behavior of a straddle-type vehicle that includes suspensions, and damping forces of the suspensions and a braking force generated to the straddle-type vehicle are controlled by a control system. The control method includes: an execution step of executing braking force adjustment control for adjusting the braking force generated to the straddle-type vehicle so as to suppress rear lift-up that causes a rear wheel of the straddle-type vehicle to lift off from the ground; and an adjustment step of adjusting initiation timing of the braking force adjustment control by using a physical quantity to which states of the suspensions are reflected.

Advantageous Effects of Invention

In the control system and the control method according to the present invention, the damping forces of the suspensions and the braking force generated to the straddle-type vehicle are controlled. The braking force adjustment control is executed to adjust the braking force generated to the straddle-type vehicle so as to suppress the rear lift-up that causes the rear wheel of the straddle-type vehicle to lift off from the ground, and the initiation timing of the braking force adjustment control is controlled by using the physical quantity to which the states of the suspensions are reflected. As a result, it is possible to optimize the initiation timing of the braking force adjustment control, which is control of the braking force for suppressing the rear lift-up, according to the situation of occurrence of the rear lift-up (for example, a possibility of the occurrence of the rear lift-up or whether the rear lift-up currently occurs). Therefore, it is possible to appropriately suppress the rear lift-up of the straddle-type vehicle.

DETAILED DESCRIPTION

A description will hereinafter be made on a control system according to the present invention with reference to the drawings. Hereinafter, a description will be made on the control system used for a two-wheeled motorcycle. However, the control system according to the present invention may be used for a straddle-type vehicle other than the two-wheeled motorcycle (for example, a three-wheeled motorcycle, an all-terrain vehicle, a bicycle, or the like). The straddle-type vehicle means a vehicle that a rider straddles, and includes a scooter and the like.

A description will hereinafter be made on a case where each of a front-wheel brake mechanism and a rear-wheel brake mechanism is provided in one unit; however, at least one of the front-wheel brake mechanism and the rear-wheel brake mechanism may be provided in multiple units. Alternatively, one of the front-wheel brake mechanism and the rear-wheel brake mechanism may not be provided.

A configuration, operation, and the like, which will be described below, merely constitute one example. The control system and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

<Configuration of Motorcycle>

A description will be made on a configuration of a motorcycle 100 to which a control system 90 according to an embodiment of the present invention is mounted with reference to FIG. 1 to FIG. 4.

Figure 1:
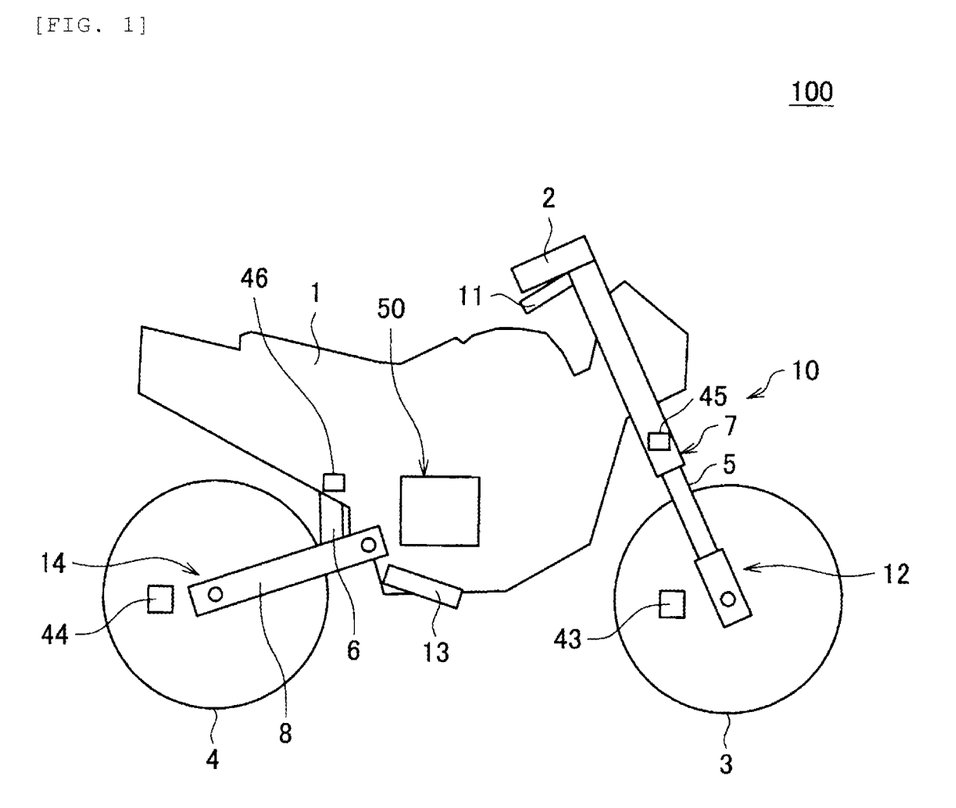
FIG. 1 is a schematic view of a configuration of a motorcycle to which a control system according to an embodiment of the present invention is mounted.
Figure 2:
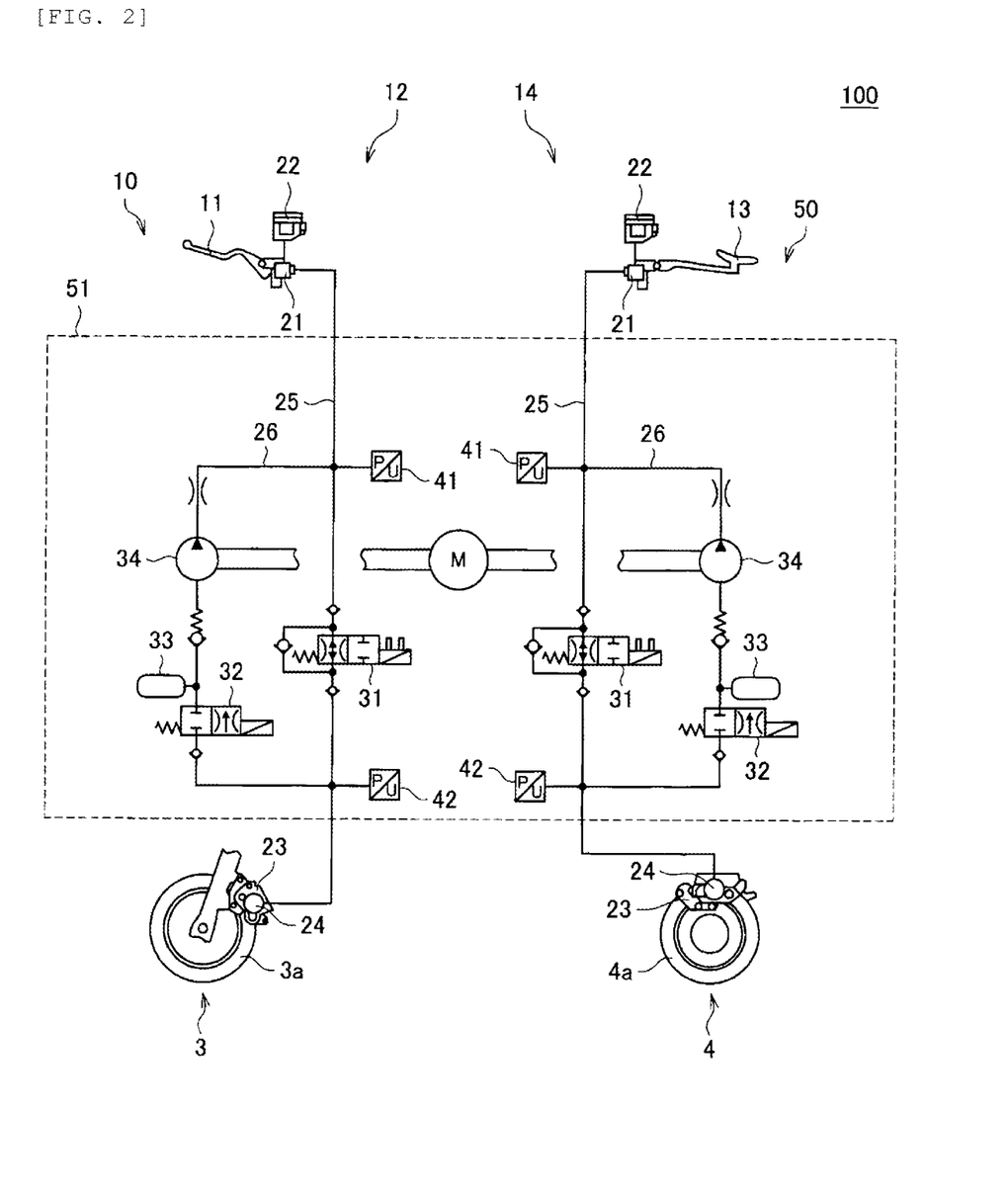
FIG. 2 is a schematic view of a configuration of a brake system according to the embodiment of the present invention.
Figure 3:
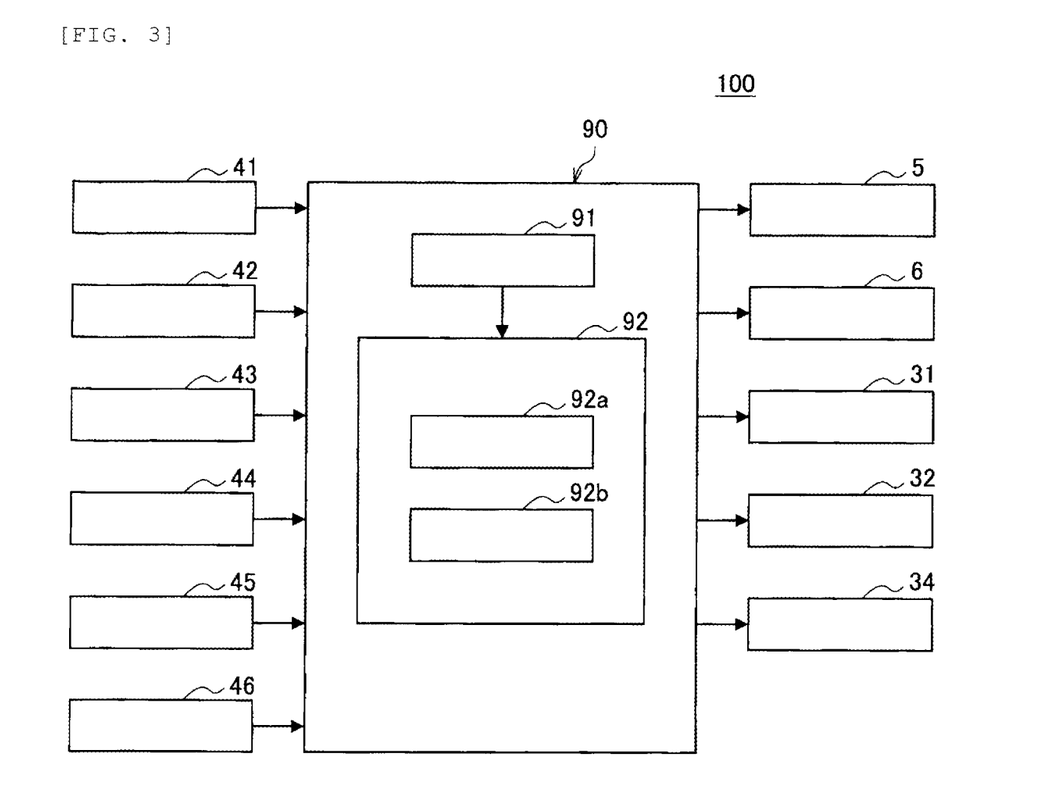
FIG. 3 is a block diagram of an exemplary functional configuration of the controller system according to the embodiment of the present invention.
Figure 4:
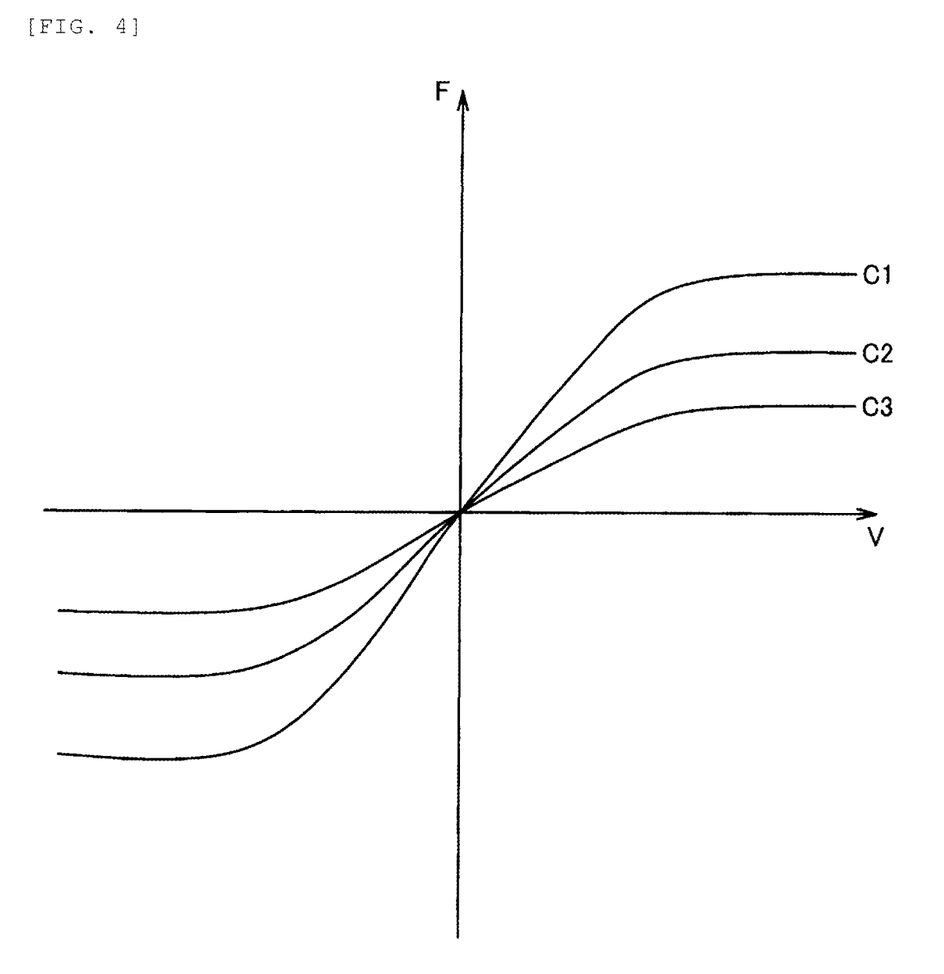
FIG. 4 is a graph for illustrating a damping characteristic of a suspension.

FIG. 1 is a schematic view of a configuration of the motorcycle 100 to which the control system 90 is mounted. FIG. 2 is a schematic view of a configuration of a brake system 10 for the motorcycle 100. FIG. 3 is a block diagram of an exemplary functional configuration of the control system 90. FIG. 4 is a graph for illustrating a damping characteristic of a suspension.

As illustrated in FIG. 1, the motorcycle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; a front suspension 5; a rear suspension 6; and the brake system 10 that includes a hydraulic pressure control unit 50. The motorcycle 100 further includes: master-cylinder pressure sensors 41 (see FIG. 2), wheel-cylinder pressure sensors 42 (see FIG. 2), a front-wheel rotational frequency sensor 43, a rear-wheel rotational frequency sensor 44, a front stroke sensor 45, and a rear stroke sensor 46. Moreover, as illustrated in FIG. 3, the motorcycle 100 includes the control system 90 that controls behavior of the motorcycle 100.

Each of the front suspension 5 and the rear suspension 6 corresponds to an example of a suspension of the motorcycle 100, and is interposed between the trunk 1 and the wheel. More specifically, the front suspension 5 is provided to a front fork 7 that connects the handlebar 2 and the front wheel 3, and can be extended/compressed along an axial direction of the front suspension 5. The rear suspension 6 connects the trunk 1 and a swing arm 8 that is swingably supported by the trunk 1 and holds the rear wheel 4 in the freely turnable manner, and can be extended/compressed along an axial direction of the rear suspension 6.

More specifically, each of the front suspension 5 and the rear suspension 6 includes a spring and a damper. When the spring and the damper are extended/compressed along the axial direction of the suspension, vibrations from a road surface are absorbed, and transmission of the vibrations to a body of the motorcycle 100 is suppressed. For example, in a hydraulic oil channel that is formed in the damper of the suspension, a control valve is provided to control the damping characteristic of the suspension (more specifically, a characteristic of a damping force with respect to a stroke speed of the suspension). By controlling operation of the control valve, the damping characteristic of the suspension is controlled, which further controls the damping force of the suspension.

The damping characteristic of the suspension may be controlled by a method other than the above (for example, a method for controlling a magnetic field produced in the damper by using a magnetic fluid as the hydraulic oil in the damper of the suspension).

The front stroke sensor 45 detects a stroke amount of the front suspension 5 and outputs a detection result. The front stroke sensor 45 may detect another physical quantity (for example, stroke acceleration of the front suspension 5, a force applied to the front suspension 5, or the like) that can substantially be converted to the stroke amount of the front suspension 5. The front stroke sensor 45 is provided to the front suspension 5, for example.

The rear stroke sensor 46 detects a stroke amount of the rear suspension 6 and outputs a detection result. The rear stroke sensor 46 may detect another physical quantity (for example, stroke acceleration of the rear suspension 6, a force applied to the rear suspension 6, or the like) that can substantially be converted to the stroke amount of the rear suspension 6. The rear stroke sensor 46 is provided to the rear suspension 6, for example.

As illustrated in FIG. 1 and FIG. 2, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in an interlocking manner with at least the second brake operation section 13. The brake system 10 also includes the hydraulic pressure control unit 50, and the front-wheel brake mechanism 12 and the rear-wheel brake mechanism 14 are partially included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation section 11 is provided to the handlebar 2 and is operated by the rider's hand. The first brake operation section 11 is a brake lever, for example. The second brake operation section 13 is provided in a lower portion of the trunk 1 and is operated by the rider's foot. The second brake operation section 13 is a brake pedal, for example.

Each of the front-wheel brake mechanism 12 and the rear-wheel brake mechanism 14 includes: a master cylinder 21 that includes a piston (not illustrated); a reservoir 22 that is attached to the master cylinder 21; a brake caliper 23 that is held by the trunk 1 and has a brake pad (not illustrated); a wheel cylinder 24 that is provided to the brake caliper 23; a primary channel 25 through which a brake fluid in the master cylinder 21 flows into the wheel cylinder 24; and a secondary channel 26 through which the brake fluid in the wheel cylinder 24 is released.

An inlet valve (EV) 31 is provided to the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side.

The inlet valve 31 is an electromagnetic valve that is opened in an unenergized state and closed in an energized state, for example. The outlet valve 32 is an electromagnetic valve that is closed in an unenergized state and opened in an energized state, for example.

The hydraulic pressure control unit 50 includes: components such as the inlet valves 31, the outlet valves 32, the accumulators 33, and the pumps 34 used to control a brake hydraulic pressure; and a base body 51 in which those components are provided and channels constituting the primary channels 25 and the secondary channels 26 are formed.

The base body 51 may be formed of one member or may be formed of multiple members. In the case where the base body 51 is formed of the multiple members, the components may separately be provided in the different members.

The control system 90 controls operation of each of the components in the hydraulic pressure control unit 50. In this way, the braking force to be generated to the motorcycle 100 (more specifically, the braking force to be generated on the front wheel 3 by the front-wheel brake mechanism 12 and the braking force to be generated on the rear wheel 4 by the rear-wheel brake mechanism 14) is controlled.

For example, during a normal time (that is, when the braking force corresponding to a brake operation by the rider is generated to the motorcycle 100), the control system 90 opens the inlet valves 31 and closes the outlet valves 32. When the first brake operation section 11 is operated in such a state, in the front-wheel brake mechanism 12, the piston (not illustrated) in the master cylinder 21 is pressed to increase a hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The master-cylinder pressure sensor 41 detects a hydraulic pressure of the brake fluid in the master cylinder 21 and outputs a detection result. The master-cylinder pressure sensor 41 may detect another physical quantity that can substantially be converted to the hydraulic pressure of the brake fluid in the master cylinder 21. The master-cylinder pressure sensor 41 is provided in each of the front-wheel brake mechanism 12 and the rear-wheel brake mechanism 14.

The wheel-cylinder pressure sensor 42 detects the hydraulic pressure of the brake fluid in the wheel cylinder 24 and outputs a detection result. The wheel-cylinder pressure sensor 42 may detect another physical quantity that can substantially be converted to the hydraulic pressure of the brake fluid in the wheel cylinder 24. The wheel-cylinder pressure sensor 42 is provided to each of the front-wheel brake mechanism 12 and the rear-wheel brake mechanism 14.

The front-wheel rotational frequency sensor 43 is a rotational frequency sensor that detects a rotational frequency of the front wheel 3 (for example, a rotational frequency of the front wheel 3 per unit time [rpm], a travel distance per unit time [km/h], or the like), and outputs a detection result. The front-wheel rotational frequency sensor 43 may detect another physical quantity that can substantially be converted to the rotational frequency of the front wheel 3. The front-wheel rotational frequency sensor 43 is provided to the front wheel 3.

The rear-wheel rotational frequency sensor 44 is a rotational frequency sensor that detects a rotational frequency of the rear wheel 4 (for example, the rotational frequency of the rear wheel 4 per unit time [rpm], a travel distance per unit time [km/h], or the like), and outputs a detection result. The rear-wheel rotational frequency sensor 44 may detect another physical quantity that can substantially be converted to the rotational frequency of the rear wheel 4. The rear-wheel rotational frequency sensor 44 is provided to the rear wheel 4.

The control system 90 controls operation of each device in the motorcycle 100, so as to control the behavior of the motorcycle 100.

The control system 90 may be formed of a single controller or may be formed of multiple controllers. The controller that constitutes the control system 90 may partially or entirely be constructed of a microcomputer, a microprocessor unit, or the like, may be constructed of a member in which firmware or the like can be updated, or may be a program module or the like that is executed by a command from a CPU or the like, for example.

As illustrated in FIG. 3, the control system 90 includes an acquisition section 91 and a control section 92, for example. In the case where the control system 90 is formed of the multiple controllers, functional sections that are the acquisition section 91 and the control section 92 may be provided in the single controller or may separately be provided in the multiple controllers. For example, a suspension control section 92a and a brake control section 92b may separately be provided in the different controllers.

The acquisition section 91 acquires information that is output from each of the devices mounted to the motorcycle 100, and outputs the acquired information to the control section 92. For example, the acquisition section 91 acquires the information output from the master-cylinder pressure sensors 41, the wheel-cylinder pressure sensors 42, the front-wheel rotational frequency sensor 43, the rear-wheel rotational frequency sensor 44, the front stroke sensor 45, and the rear stroke sensor 46.

The control section 92 controls the damping forces of the suspensions in the motorcycle 100 and the braking force generated to the motorcycle 100. The control section 92 includes the suspension control section 92a and the brake control section 92b, for example.

The suspension control section 92a controls the damping characteristics of the front suspension 5 and the rear suspension 6, and thereby controls the damping forces of the front suspension 5 and the rear suspension 6.

More specifically, the damping force of each of the suspensions is generated in a direction that corresponds to the positive or negative stroke speed (that is, a stroke direction of each of the suspensions). In general, a magnitude (an absolute value) of the damping force of the suspension is increased as a magnitude (an absolute value) of the stroke speed is increased. For example, FIG. 4 exemplifies damping characteristics C1, C2, C3 as the damping characteristics of the suspension. FIG. 4 illustrates each of the damping characteristics with a stroke speed V on a horizontal axis and a damping force F on a vertical axis.

In the example illustrated in FIG. 4, the magnitudes of the damping forces generated at the same stroke speed are sequentially reduced in an order of the damping characteristics C1, C2, C3. Thus, for example, by changing the damping characteristic of the suspension from the damping characteristic C2 to the damping characteristic C1, the damping force of the suspension can be increased (that is, the suspension can be hardened). Meanwhile, by changing the damping characteristic of the suspension from the damping characteristic C2 to the damping characteristic C3, the damping force of the suspension can be reduced (that is, the suspension can be softened). In order to facilitate understanding, FIG. 4 illustrates the three damping characteristics in a discrete manner. However, the damping characteristic of each of the front suspension 5 and the rear suspension 6 may be continuously changeable.

More specifically, the suspension control section 92a controls the damping forces of the front suspension 5 and the rear suspension 6 so as to suppress pitching of the motorcycle 100 (that is, a change in a posture of the motorcycle 100 in a direction in which the motorcycle 100 rotates about an axis in a vehicle right-left direction). For example, the suspension control section 92a controls the damping forces of the front suspension 5 and the rear suspension 6 by using the stroke amount of the front suspension 5 detected by the front stroke sensor 45 and the stroke amount of the rear suspension 6 detected by the rear stroke sensor 46. In this way, the suspension control section 92a can suppress the pitching of the motorcycle 100. In detail, the suspension control section 92a hardens the front suspension 5 and the rear suspension 6 as the pitching of the motorcycle 100 is increased, for example. In this way, the suspension control section 92a can suppress the pitching of the motorcycle 100.

The brake control section 92b controls the braking force to be generated to the motorcycle 100 by controlling operation of each of the components of the hydraulic pressure control unit 50 in the brake system 10.

In the normal time, as described above, the brake control section 92b controls the operation of each of the components in the hydraulic pressure control unit 50 such that the braking force corresponding to the brake operation by the rider is generated to the motorcycle 100. Meanwhile, under a particular situation, the brake control section 92b executes control for adjusting the braking force to be generated to the motorcycle 100 from the braking force corresponding to the brake operation by the rider.

For example, the brake control section 92b brings the motorcycle 100 into a state where the inlet valve 31 is closed and the outlet valve 32 is opened, and drives the pump 34 in such a state. In this way, the brake control section 92b reduces the hydraulic pressure of the brake fluid in the wheel cylinder 24, and can thereby reduce the braking force to be generated on the wheel. In addition, for example, the brake control section 92b closes both of the inlet valve 31 and the outlet valve 32 from the above state. In this way, the brake control section 92b keeps the hydraulic pressure of the brake fluid in the wheel cylinder 24, and can thereby keep the braking force to be generated on the wheel. Furthermore, for example, the brake control section 92b opens the inlet valve 31 and closes the outlet valve 32 from the above state. In this way, the brake control section 92b increases the hydraulic pressure of the brake fluid in the wheel cylinder 24, and can thereby increase the braking force to be generated on the wheel.

As the control for adjusting the braking force to be generated to the motorcycle 100 from the braking force corresponding to the brake operation by the rider, the brake control section 92b executes anti-lock brake control for suppressing locking of the wheels during braking of the motorcycle 100, for example.

For example, when a slip rate of the wheel (that is, a value that is obtained by dividing a difference between a vehicle speed and the wheel rotational frequency by the vehicle speed) exceeds a reference slip rate during braking of the motorcycle 100, the brake control section 92b executes the anti-lock brake control. Here, the reference slip rate is a value set such that it is possible to appropriately determine whether the slip rate is high enough to cause locking or possible locking of the wheel, and can appropriately be set according to a specification of the vehicle. For example, the brake control section 92b can estimate the slip rate by using the front-wheel rotational frequency sensor 43 and the rear-wheel rotational frequency sensor 44, for example. Then, in the anti-lock brake control, the brake control section 92b reduces the braking force to be generated on the wheel as a control target.

Here, as the control for adjusting the braking force to be generated to the motorcycle 100 from the braking force corresponding to the brake operation by the rider, the brake control section 92b executes braking force adjustment control for adjusting the braking force to be generated to the motorcycle 100 so as to suppress rear lift-up that causes the rear wheel 4 to lift off from the ground.

For example, in the braking force adjustment control, the brake control section 92b reduces the braking force to be generated to the motorcycle 100 to be smaller than the braking force before initiation of the braking force adjustment control. As described above, the rear lift-up occurs when the excessive braking force is generated to the motorcycle 100. By reducing the braking force to be generated to the motorcycle 100 to be smaller than the braking force before the initiation of the braking force adjustment control, it is possible to effectively suppress the generation of the excessive braking force to the motorcycle 100. Therefore, the rear lift-up can effectively be suppressed.

In addition, for example, in the braking force adjustment control, the brake control section 92b maintains the braking force generated to the motorcycle 100 to a smaller value than a reference braking force. More specifically, the reference braking force is set to the braking force, generation of which is anticipated when the rear lift-up occurs in a process of increasing the braking force to be generated to the motorcycle 100. By maintaining the braking force generated to the motorcycle 100 to the smaller value than the reference braking force, it is possible to suppress the excessive braking force from being generated to the motorcycle 100 while suppressing the braking force to be generated to the motorcycle 100 from becoming excessively small. Thus, it is possible to suppress an increase in a braking distance while suppressing the rear lift-up.

As described above, in the control system 90, the control section 92 executes the braking force adjustment control for adjusting the braking force to be generated to the motorcycle 100 so as to suppress the rear lift-up. The control section 92 controls initiation timing of the braking force adjustment control by using a physical quantity to which states of the suspensions of the motorcycle 100 are reflected. In this way, the rear lift-up of the motorcycle 100 is appropriately suppressed. A detailed description will be made later on processing that is related to the control for suppressing the rear lift-up and that is executed by the control system 90.

<Operation of Control System>

A description will be made on operation of the control system 90 according to the embodiment of the present invention with reference to FIG. 5.

Figure 5:
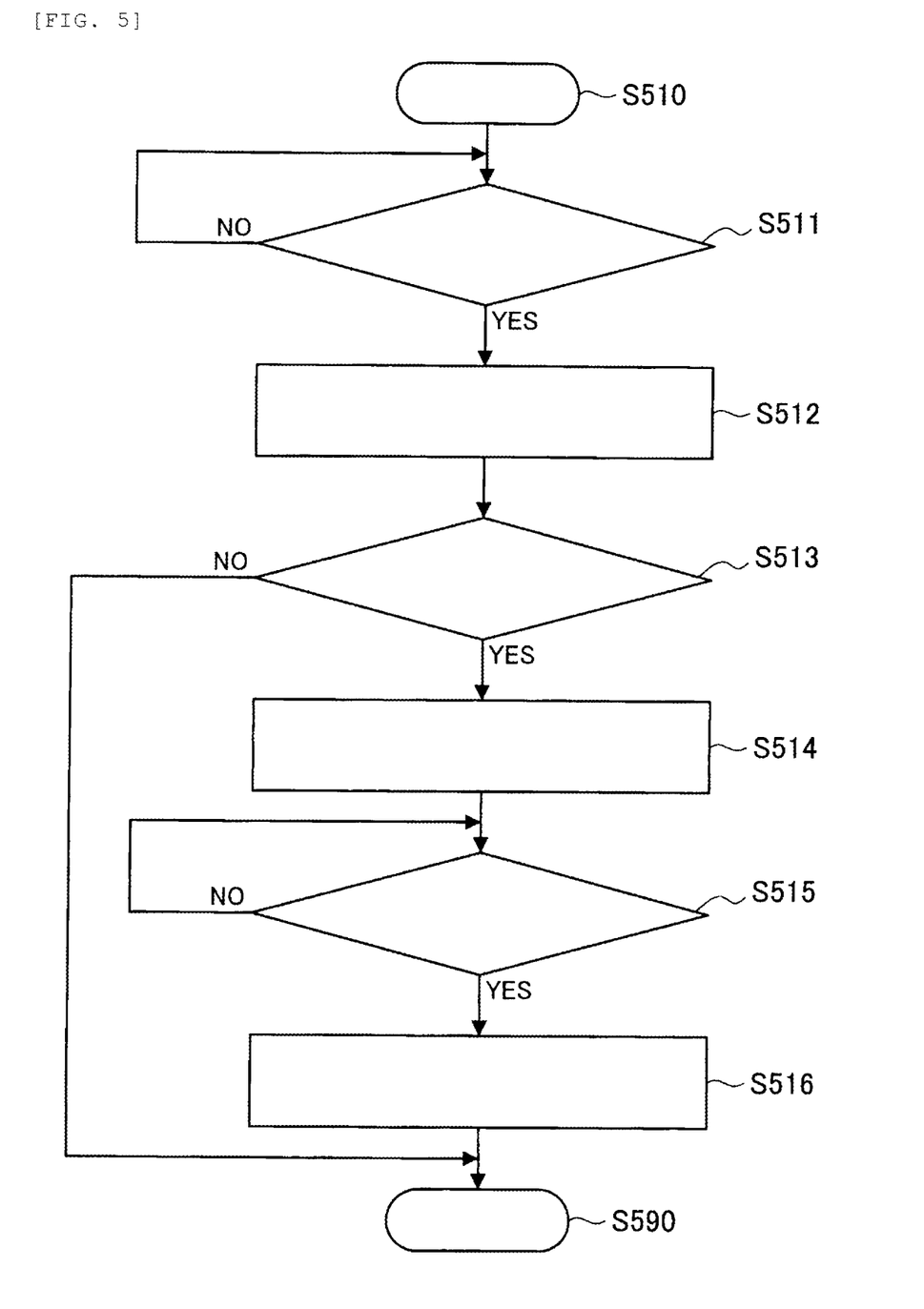
FIG. 5 is a flowchart of an example of a processing procedure that is executed by the control system according to the embodiment of the present invention.

FIG. 5 is a flowchart of an example of a processing procedure that is executed by the control system 90. More specifically, the control flow illustrated in FIG. 5 corresponds to a processing procedure related to the control that is executed by the control section 92 in the control system 90 to suppress the rear lift-up, and is repeatedly executed. In addition, step S510 and step S590 in FIG. 5 respectively correspond to initiation and termination of the control flow illustrated in FIG. 5.

When the control flow illustrated in FIG. 5 is initiated, in step S511, the control section 92 determines whether a possibility of the occurrence of the rear lift-up is higher than a reference. If it is determined that possibility of the occurrence of the rear lift-up is higher than the reference (step S511/YES), the processing proceeds to step S512. On the other hand, if it is determined that possibility of the occurrence of the rear lift-up is equal to or lower than the reference (step S511/NO), the processing in step S511 is repeated.

More specifically, the control section 92 determines the possibility of the occurrence of the rear lift-up on the basis of the physical quantity to which the states of the suspensions of the motorcycle 100 are reflected. Here, the possibility of the occurrence of the rear lift-up varies according to the posture in a pitch direction of the motorcycle 100, and the posture in the pitch direction of the motorcycle 100 varies according to the states of the suspensions. Thus, by determining the possibility of the occurrence of the rear lift-up on the basis of the physical quantity to which the states of the suspensions are reflected, it is possible to appropriately determine the possibility of the occurrence of the rear lift-up according to the posture in the pitch direction of the motorcycle 100.

Here, from a perspective of further appropriately determining the possibility of the occurrence of the rear lift-up, the control section 92 preferably determines the possibility of the occurrence of the rear lift-up on the basis of the physical quantity, to which the stroke amounts of the suspensions are reflected, as the states of the suspensions of the motorcycle 100. For example, the control section 92 can determine the possibility of the occurrence of the rear lift-up by using, as such a physical quantity, the stroke amount of the front suspension 5 detected by the front stroke sensor 45 and the stroke amount of the rear suspension 6 detected by the rear stroke sensor 46.

In detail, for example, in the case where the rear suspension 6 continues being extended while the stroke amount of the front suspension 5 is maintained, the control section 92 determines that there is the possibility of the occurrence of the rear lift-up. Furthermore, in the case where the stroke speed of the rear suspension 6 is high, the control section 92 can determine that the possibility of the occurrence of the rear lift-up is high.

In addition, from the perspective of further appropriately determining the possibility of the occurrence of the rear lift-up, the control section 92 preferably determines the possibility of the occurrence of the rear lift-up by using a position of a center of gravity of the motorcycle 100 as the physical quantity to which the stroke amounts of the suspensions of the motorcycle 100 are reflected. For example, the control section 92 estimates the position of the center of gravity of the motorcycle 100 on the basis of the stroke amount of the front suspension 5 detected by the front stroke sensor 45 and the stroke amount of the rear suspension 6 detected by the rear stroke sensor 46, and can thereby determine the possibility of the occurrence of the rear lift-up by using the estimated position of the center of gravity.

In detail, moment of a force around the front wheel 3 that is generated by own weight of the motorcycle 100 varies according to the position of the center of gravity of the motorcycle 100. Here, the possibility of the occurrence of the rear lift-up varies according to the moment of the force around the front wheel 3 that is generated by the own weight of the motorcycle 100. Thus, by determining the possibility of the occurrence of the rear lift-up by using the position of the center of gravity of the motorcycle 100, it is possible to appropriately determine the possibility of the occurrence of the rear lift-up according to the moment of the force around the front wheel 3 that is generated by the own weight of the motorcycle 100.

The reference that is used to determine whether the possibility of the occurrence of the rear lift-up is higher than the reference can appropriately be set in consideration of a balance between a perspective of improving reliability of suppressing the rear lift-up and a perspective of lowering a frequency of unnecessary execution of the control for suppressing the rear lift-up. More specifically, as the reference used for the above determination is set lower, the effect of improving the reliability of suppressing the rear lift-up is increased, and the frequency of the unnecessary execution of the control for suppressing the rear lift-up is also increased. On the contrary, as the reference used for the above determination is set higher, the effect of improving the reliability of suppressing the rear lift-up is reduced, and the frequency of the unnecessary execution of the control for suppressing the rear lift-up is also reduced.

If it is determined YES in step S511, in step S512, the control section 92 executes damping force adjustment control. The damping force adjustment control is control for adjusting the damping forces of the suspensions so as to suppress the rear lift-up.

For example, the control section 92 softens the rear suspension 6 in the damping force adjustment control. As a result, the rear wheel 4 can easily follow the contour of the ground, and thus can contribute to body stability. However, the damping force adjustment control is not particularly limited to the above example. For example, depending on a situation, the rear lift-up may be suppressed by hardening the rear suspension 6. In such a case, the rear suspension 6 may be hardened in the damping force adjustment control.

Next, in step S513, the control section 92 determines whether the possibility of the occurrence of the rear lift-up is higher than the reference. If it is determined that the possibility of the occurrence of the rear lift-up is higher than the reference (step S513/YES), the processing proceeds to step S514. On the other hand, if it is determined that the possibility of the occurrence of the rear lift-up is equal to or lower than the reference (step S513/NO), the control flow illustrated in FIG. 5 is terminated.

More specifically, similar to step S511, the control section 92 determines the possibility of the occurrence of the rear lift-up on the basis of the physical quantity to which the states of the suspensions of the motorcycle 100 are reflected.

The reference that is used to determine whether the possibility of the occurrence of the rear lift-up is higher than the reference can appropriately be set in consideration of the balance between the perspective of improving the reliability of suppressing the rear lift-up and the perspective of lowering the frequency of the unnecessary execution of the control for suppressing the rear lift-up. The reference used for the determination in step S513 may be set to be equal to or near the reference used for the determination in step s511, or may differ from (for example, may be higher than) the reference used for the determination in step S511.

If it is determined YES in step S513, in step S514, the control section 92 initiates the braking force adjustment control. As described above, the braking force adjustment control is the control for adjusting the braking force to be generated to the motorcycle 100 so as to suppress the rear lift-up.

Just as described, the control section 92 controls the initiation timing of the braking force adjustment control by using the physical quantity to which the states of the suspensions of the motorcycle 100 are reflected. As a result, compared to a case where the initiation timing of the braking force adjustment control is controlled by using the detection results of the wheel rotational frequency sensors such as the front-wheel rotational frequency sensor 43 and the rear-wheel rotational frequency sensor 44, it is possible to optimize the initiation timing of the braking force adjustment control, which is the braking force control for suppressing the rear lift-up, according to a situation of the occurrence of the rear lift-up (for example, in the control flow illustrated in FIG. 5, the possibility of the occurrence of the rear lift-up).

For example, as described above, in the control flow illustrated in FIG. 5, the control section 92 determines the possibility of the occurrence of the rear lift-up on the basis of the physical quantity to which the states of the suspensions of the motorcycle 100 are reflected. Then, when determining that the possibility of the occurrence of the rear lift-up is higher than the reference, the control section 92 initiates the braking force adjustment control. In this way, it is possible to initiate the braking force adjustment control after appropriately determining that the possibility of the occurrence of the rear lift-up is higher than the reference.

However, the initiation timing of the braking force adjustment control, which is controlled by using the physical quantity to which the states of the suspensions of the motorcycle 100 are reflected, is not particularly limited to the above example. For example, the control section 92 may determine whether the rear lift-up currently occurs on the basis of the physical quantity to which the states of the suspensions of the motorcycle 100 are reflected. Then, when determining that the rear lift-up currently occurs, the control section 92 may initiate the braking force adjustment control.

The posture in the pitch direction of the motorcycle 100 differs between the case where the rear lift-up occurs and the case where the rear lift-up does not occur. The posture in the pitch direction of the motorcycle 100 varies according to the states of the suspensions. Thus, by determining whether the rear lift-up occurs on the basis of the physical quantity to which the states of the suspensions are reflected, it is possible to appropriately determine whether the rear lift-up occurs according to the posture in the pitch direction of the motorcycle 100. That is, it is determined whether the rear lift-up currently occurs on the basis of the physical quantity to which the states of the suspensions of the motorcycle 100 are reflected. Then, if it is determined that the rear lift-up currently occurs, the braking force adjustment control is initiated. In this way, it is possible to initiate the braking force adjustment control after appropriately determining that the rear lift-up currently occurs.

Here, from a perspective of appropriately suppressing the rear lift-up by the braking force adjustment control, the control section 92 preferably controls a degree of a change in the braking force in the braking force adjustment control by using the physical quantity to which the states of the suspensions of the motorcycle 100 are reflected. For example, it is possible to appropriately suppress the rear lift-up by the braking force adjustment control when the degree of the change in the braking force (for example, a reduced amount of the braking force) in the braking force adjustment control is increased as the possibility of the occurrence of the rear lift-up that is determined on the basis of the above physical quantity is increased.

Next, in step S515, the control section 92 determines whether the possibility of the occurrence of the rear lift-up is lower than the reference. If it is determined that the possibility of the occurrence of the rear lift-up is lower than the reference (step S515/YES), the processing proceeds to step S516. On the other hand, if the possibility of the occurrence of the rear lift-up is equal to or higher than the reference (step S515/NO), the processing in step S515 is repeated.

More specifically, similar to step S511, the control section 92 determines the possibility of the occurrence of the rear lift-up on the basis of the physical quantity to which the states of the suspensions of the motorcycle 100 are reflected.

The reference that is used to determine whether the possibility of the occurrence of the rear lift-up is lower than the reference can appropriately be set in consideration of a balance between the perspective of improving the reliability of suppressing the rear lift-up and a perspective of suppressing of unnecessary continuation of the control for suppressing the rear lift-up. More specifically, as the reference used for the above determination is set lower, the effect of improving the reliability of suppressing the rear lift-up is increased, and an effect of suppressing the unnecessary continuation of the control for suppressing the rear lift-up is reduced. On the contrary, as the reference used for the above determination is set higher, the effect of improving the reliability of suppressing the rear lift-up is reduced, and the effect of suppressing the unnecessary continuation of the control for suppressing the rear lift-up is increased. The reference used for the determination in step S515 may be set to be equal to or near the reference used for the determination in step s511 or step S513, or may differ from the reference used for the determination in step s511 or step S513.

If it is determined YES in step S515, in step S516, the control section 92 terminates the braking force adjustment control.

Just as described, the control section 92 preferably controls the termination timing of the braking force adjustment control by using the physical quantity to which the states of the suspensions of the motorcycle 100 are reflected. As a result, compared to a case where the termination timing of the braking force adjustment control is controlled by using the detection results of the wheel rotational frequency sensors such as the front-wheel rotational frequency sensor 43 and the rear-wheel rotational frequency sensor 44, it is possible to optimize the termination timing of the braking force adjustment control, which is the control of the braking force for suppressing the rear lift-up, according to the situation of the occurrence of the rear lift-up (for example, in the control flow illustrated in FIG. 5, the possibility of the occurrence of the rear lift-up). In this way, it is possible to further appropriately suppress the rear lift-up of the motorcycle 100.

For example, as described above, in the control flow illustrated in FIG. 5, the control section 92 determines the possibility of the occurrence of the rear lift-up on the basis of the physical quantity to which the states of the suspensions of the motorcycle 100 are reflected. Then, when determining that the possibility of the occurrence of the rear lift-up is lower than the reference, the control section 92 terminates the braking force adjustment control. In this way, it is possible to terminate the braking force adjustment control after appropriately determining that the possibility of the occurrence of the rear lift-up is lower than the reference.

However, the termination timing of the braking force adjustment control, which is controlled by using the physical quantity to which the states of the suspensions of the motorcycle 100 are reflected, is not particularly limited to the above example. For example, the control section 92 may determine whether the rear lift-up currently occurs on the basis of the physical quantity to which the states of the suspensions of the motorcycle 100 are reflected. Then, when determining that the rear lift-up does not currently occur, the control section 92 may terminate the braking force adjustment control. In this way, it is possible to terminate the braking force adjustment control after appropriately determining that the rear lift-up does not currently occur.

Next, the control flow illustrated in FIG. 5 is terminated.

As described above, in the control flow illustrated in FIG. 5, the control section 92 determines the possibility of the occurrence of the rear lift-up on the basis of the physical quantity to which the states of the suspensions of the motorcycle 100 are reflected. Then, when determining that the possibility of the occurrence of the rear lift-up is higher than the reference, the control section 92 executes the damping force adjustment control prior to the initiation of the braking force adjustment control. As a result, it is possible to avoid the execution of the braking force adjustment control under a situation where the rear lift-up can sufficiently be suppressed by the damping force adjustment control. Therefore, it is possible to suppress the increase in the braking distance caused by the execution of the braking force adjustment control.

<Effects of Control System>

A description will be made on effects of the control system 90 according to the embodiment of the invention.

The control system 90 includes the control section 92 that controls the damping forces of the suspensions of the motorcycle 100 and the braking force generated to the motorcycle 100. The control section 92 executes the braking force adjustment control for adjusting the braking force to be generated to the motorcycle 100 so as to suppress the rear lift-up that causes the rear wheel 4 of the motorcycle 100 to lift off from the ground. The control section 92 controls the initiation timing of the braking force adjustment control by using the physical quantity to which the states of the suspensions of the motorcycle 100 are reflected. As a result, compared to the case where the initiation timing of the braking force adjustment control is controlled by using the detection results of the wheel rotational frequency sensors such as the front-wheel rotational frequency sensor 43 and the rear-wheel rotational frequency sensor 44, it is possible to optimize the initiation timing of the braking force adjustment control, which is the braking force control for suppressing the rear lift-up, according to the situation of the occurrence of the rear lift-up (for example, the possibility of the occurrence of the rear lift-up or whether the rear lift-up currently occurs). Therefore, it is possible to appropriately suppress the rear lift-up of the motorcycle 100.

Preferably, the control section 92 in the control system 90 determines the possibility of the occurrence of the rear lift-up on the basis of the physical quantity to which the states of the suspensions of the motorcycle 100 are reflected. Then, when determining that the possibility of the occurrence of the rear lift-up is higher than the reference, the control section 92 initiates the braking force adjustment control. In this way, it is possible to initiate the braking force adjustment control after appropriately determining that the possibility of the occurrence of the rear lift-up is higher than the reference. Therefore, it is possible to appropriately suppress the rear lift-up of the motorcycle 100 in advance.

Preferably, the control section 92 in the control system 90 determines whether the rear lift-up currently occurs on the basis of the physical quantity to which the states of the suspensions of the motorcycle 100 are reflected. Then, when determining that the rear lift-up currently occurs, the control section 92 initiates the braking force adjustment control. In this way, it is possible to initiate the braking force adjustment control after appropriately determining that the rear lift-up currently occurs. Therefore, it is possible to appropriately suppress the rear lift-up of the motorcycle 100 while suppressing the increase in the braking distance caused by the execution of the braking force adjustment control.

Preferably, the control section 92 in the control system 90 determines the possibility of the occurrence of the rear lift-up on the basis of the physical quantity to which the states of the suspensions of the motorcycle 100 are reflected. Then, when determining that the possibility of the occurrence of the rear lift-up is higher than the reference, prior to the initiation of the braking force adjustment control, the control section 92 executes the damping force adjustment control for adjusting the damping forces of the suspensions so as to suppress the rear lift-up. In this way, it is possible to avoid the execution of the braking force adjustment control under the situation where the rear lift-up can sufficiently be suppressed by the damping force adjustment control. Therefore, it is possible to suppress the increase in the braking distance caused by the execution of the braking force adjustment control. Meanwhile, under a situation where it is difficult to sufficiently suppress the rear lift-up by the damping force adjustment control, the braking force adjustment control is executed. In this way, it is possible to appropriately suppress the rear lift-up.

Preferably, the control section 92 in the control system 90 controls the termination timing of the braking force adjustment control by using the physical quantity to which the states of the suspensions of the motorcycle 100 are reflected. In this way, compared to the case where the termination timing of the braking force adjustment control is controlled by using the detection results of the wheel rotational frequency sensors such as the front-wheel rotational frequency sensor 43 and the rear-wheel rotational frequency sensor 44, it is possible to optimize the termination timing of the braking force adjustment control, which is the control of the braking force for suppressing the rear lift-up, according to the situation of the occurrence of the rear lift-up. Therefore, it is possible to further appropriately suppress the rear lift-up of the motorcycle 100.

Preferably, the control section 92 in the control system 90 determines the possibility of the occurrence of the rear lift-up on the basis of the physical quantity to which the states of the suspensions of the motorcycle 100 are reflected. Then, when determining that the possibility of the occurrence of the rear lift-up is lower than the reference, the control section 92 terminates the braking force adjustment control. In this way, it is possible to terminate the braking force adjustment control after appropriately determining that the possibility of the occurrence of the rear lift-up is lower than the reference. Therefore, it is possible to further effectively suppress the rear lift-up of the motorcycle 100.

Preferably, the control section 92 in the control system 90 determines whether the rear lift-up currently occurs on the basis of the physical quantity to which the states of the suspensions of the motorcycle 100 are reflected. Then, when determining that the rear lift-up does not currently occur, the control section 92 terminates the braking force adjustment control. In this way, it is possible to terminate the braking force adjustment control after appropriately determining that the rear lift-up does not currently occur. Therefore, it is possible to appropriately suppress the rear lift-up of the motorcycle 100 while suppressing the increase in the braking distance caused by the execution of the braking force adjustment control.

Preferably, the control section 92 in the control system 90 controls the degree of the change in the braking force in the braking force adjustment control by using the physical quantity to which the states of the suspensions of the motorcycle 100 are reflected. In this way, it is possible to optimize the degree of the change in the braking force in the braking force adjustment control according to the situation of the occurrence of the rear lift-up. Therefore, it is possible to appropriately suppress the rear lift-up by the braking force adjustment control.

Preferably, in the control system 90, the stroke amounts of the suspensions of the motorcycle 100 are reflected to the physical quantity. In this way, as described above, it is possible to further appropriately determine the situation of the occurrence of the rear lift-up (for example, in the control flow illustrated in FIG. 5, the possibility of the occurrence of the rear lift-up). Therefore, by controlling the initiation timing of the braking force adjustment control by using the physical quantity to which the stroke amounts of the suspensions of the motorcycle 100 are reflected, it is possible to appropriately optimize the initiation timing of the braking force adjustment control according to the situation of the occurrence of the rear lift-up.

Preferably, in the control system 90, the physical quantity is the position of the center of gravity of the motorcycle 100. Accordingly, as described above, it is possible to further appropriately determine the situation of the occurrence of the rear lift-up (for example, in the control flow illustrated in FIG. 5, the possibility of the occurrence of the rear lift-up). Therefore, by controlling the initiation timing of the braking force adjustment control by using the position of the center of gravity of the motorcycle 100 as the physical quantity to which the stroke amounts of the suspensions of the motorcycle 100 are reflected, it is possible to further appropriately optimize the initiation timing of the braking force adjustment control according to the situation of the occurrence of the rear lift-up.

Preferably, in the braking force adjustment control, the control section 92 in the control system 90 reduces the braking force to be generated to the motorcycle 100 to be smaller than the braking force before the initiation of the braking force adjustment control. In this way, it is possible to effectively suppress the generation of the excessive braking force to the motorcycle 100. Therefore, the rear lift-up can effectively be suppressed.

Preferably, in the braking force adjustment control, the control section 92 in the control system 90 maintains the braking force to be generated to the motorcycle 100 to the smaller value than the reference braking force. In this way, it is possible to suppress the generation of the excessive braking force to the motorcycle 100 while suppressing the braking force to be generated to the motorcycle 100 from becoming excessively small. Thus, it is possible to suppress the increase in the braking distance while suppressing the rear lift-up.

The present invention is not limited to each of the embodiments that have been described. For example, all or parts of the embodiments may be combined, or only a part of each of the embodiments may be implemented.

REFERENCE SIGNS LIST

1: Trunk
2: Handlebar
3: Front wheel
3a: Rotor
4: Rear wheel
4a: Rotor
5: Front suspension
6: Rear suspension
7: Front fork
8: Swing arm
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
31: Inlet valve
32: Outlet valve
33: Accumulator
34: Pump
41: Master-cylinder pressure sensor
42: Wheel-cylinder pressure sensor
43: Front-wheel rotational frequency sensor
44: Rear-wheel rotational frequency sensor
45: Front stroke sensor
46: Rear stroke sensor
50: Hydraulic pressure control unit
51: Base body
90: Control system
91: Acquisition section
92: Control section
92a: Suspension control section
92b: Brake control section
100: Motorcycle

The invention claimed is:

1. A control system (90) for controlling behavior of a straddle-type vehicle (100) that includes at least one suspension (5, 6), the control system comprising:
a control section (92) that controls damping force of the at least one suspension (5, 6) and a braking force generated to the straddle-type vehicle (100), wherein
the control section (92)
executes damping force adjustment control for adjusting the damping force of the at least one suspension (5, 6) so as to suppress rear lift-up that causes a rear wheel (4) of the straddle-type vehicle (100) to lift off from the ground, when determining that a possibility of occurrence of the rear lift-up is higher than a reference,
initiates, in a state where the damping force adjustment control is executed, braking force adjustment control for adjusting the braking force generated to the straddle-type vehicle (100) so as to suppress the rear lift-up, and
controls initiation timing of the braking force adjustment control by using a quantity to which a state of the at least one suspension (5, 6) is reflected.

2. The control system according to claim 1, wherein
the control section (92)
initiates, in the state where the damping force adjustment control is executed, the braking force adjustment control, when determining that the possibility of the occurrence of the rear lift-up is higher than a reference on the basis of the quantity.

3. The control system according to claim 1, wherein
the control section (92)
initiates, in the state where the damping force adjustment control is executed, the braking force adjustment control, when determining that the rear lift-up currently occurs on the basis of the quantity.

4. The control system according to claim 2, wherein the control section (92)
executes the damping force adjustment control, when determining that the possibility of the occurrence of the rear lift-up is higher than the reference on the basis of the quantity.

5. The control system according to claim 1, wherein the control section (92) controls termination timing of the braking force adjustment control by using the quantity.

6. The control system according to claim 5, wherein the control section (92)
terminates the braking force adjustment control when determining that the possibility of the occurrence of the rear lift-up is lower than a reference on the basis of the quantity.

7. The control system according to claim 5, wherein the control section (92)
terminates the braking force adjustment control when determining that the rear lift-up does not currently occur on the basis of the quantity.

8. The control system according to claim 1, wherein the control section (92) controls a degree of a change in the braking force in the braking force adjustment control by using the quantity.

9. The control system according to claim 1, wherein a stroke amount of the at least one suspension (5, 6) is reflected to the quantity.

10. The control system according to claim 9, wherein the quantity is a position of a center of gravity of the straddle-type vehicle (100).

11. The control system according to claim 1, wherein in the braking force adjustment control, the control section (92) reduces the braking force generated to the straddle-type vehicle (100) to be smaller than the braking force before the initiation of the braking force adjustment control.

12. The control system according to claim 1, wherein in the braking force adjustment control, the control section (92) maintains the braking force generated to the straddle-type vehicle (100) to a smaller value than a reference braking force.

13. A control method for controlling behavior of a straddle-type vehicle (100) that includes at least one suspension (5, 6),
damping forces of the at least one suspension (5, 6) and a braking force generated to the straddle-type vehicle (100) being controlled by a control system (90),
the control method comprising:
an execution step (S512) of executing damping force adjustment control for adjusting the damping force of the at least one suspension (5, 6) so as to suppress rear lift-up that causes a rear wheel (4) of the straddle-type vehicle (100) to lift off from the ground, when determining that a possibility of occurrence of the rear lift-up is higher than a reference;
an execution step (S514) of initiating, in a state where the damping force adjustment control is executed, braking force adjustment control for adjusting the braking force generated to the straddle-type vehicle (100) so as to suppress the rear lift-up; and
an adjustment step (S513) of adjusting initiation timing of the braking force adjustment control by using a quantity to which a state of the at least one suspension (5, 6) is reflected.

* * * * *